United States Patent Office 2,936,874
Patented May 17, 1960

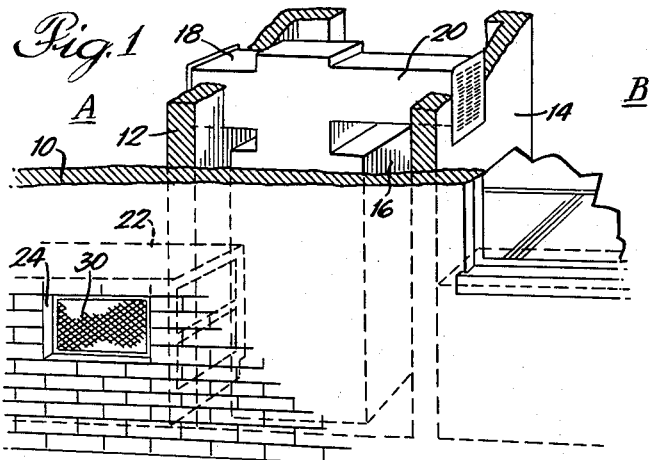
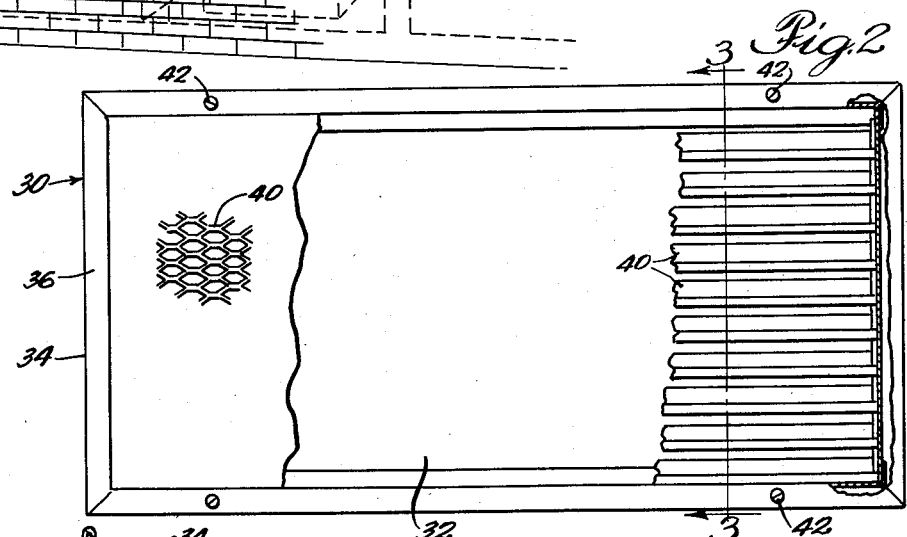
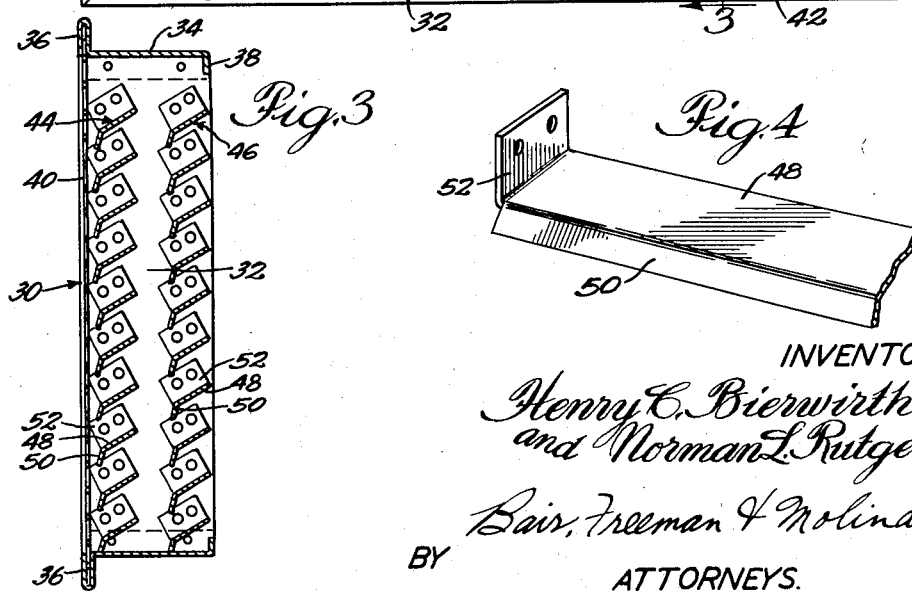
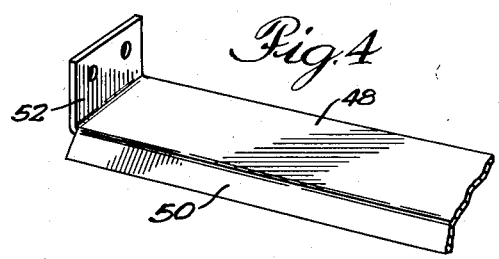

2,936,874

WEATHERPROOF OUTSIDE AIR INTAKE LOUVER UNIT

Henry C. Bierwirth, Marshalltown, and Norman L. Rutgers, Des Moines, Iowa, assignors to Lennox Industries, Inc.

Application April 21, 1958, Serial No. 729,936

2 Claims. (Cl. 98—121)

This invention relates generally to an air intake structure, and more particularly to a weatherproof outside air intake louver unit for high-velocity air flow from an exposed outside wall surface into an air processing system.

In certain types of air heating, cooling and ventilating systems for building structures, it is necessary to provide a supply of fresh outside air to the air treating and circulating equipment within the building. The most convenient means of air entry is through an opening in an outside wall having communication through suitable ducts with the air treating equipment. In those installations which require substantially large volumes of continuously circulating air within a building, such as is typified by the schoolhouse air system of our co-pending application Serial No. 729,872, filed April 21, 1958, air flows of the order of 1000 cubic feet per minute at average velocities through the air intake opening of 500 feet per minute are required. In order to provide a protective cover unit which will permit relatively free air flow at these required rates, while preventing the entry of water and other foreign matter during driving rainstorms or in high winds, a very strict demand is imposed upon louver or deflecting baffle designs.

It is a primary object of this invention, therefore, to provide an outside air intake unit providing a special arrangement of deflecting baffles which serve to permit high-velocity air intake flow while preventing the entry of precipitation or other windblown foreign material.

It is another object of this invention to provide an outside air intake unit comprising double aligned rows of particularly shaped louver members having visor flanges to eliminate entrained water and other foreign matter from a high-velocity entering air stream, while providing a minimum of resistance to air travel therethrough.

Further objects and advantages of this invention will become apparent as the following description proceeds, and the features of novelty which characterize this invention will be pointed out with particularity in the claims annexed to and forming part of this specification.

A preferred embodiment of the invention is shown in the accompanying drawing, in which:

Figure 1 is a more or less diagrammatic perspective view, partly broken away and in section, illustrating the incorporation of the outside air intake unit of the present invention in combination with a building air treating system.

Figure 2 is a front elevational view of the outside air intake unit of Figure 1, parts being broken away and in section to show details of construction.

Figure 3 is a vertical cross sectional view taken substantially as indicated along the line 3—3 on Figure 2.

Figure 4 is a fragmentary perspective view of a single deflecting baffle of the outside air intake unit of the present invention.

Referring now more particularly to Figure 1 of the drawing, we have indicated generally at 10 the outside wall of a building having inside room walls 12 and 14 separating adjacent rooms A and B. A heater unit 16 provides a source of heat for selective addition to a predetermined controlled mixture of fresh outside air and recirculated room air. Room air circulating ducts 18 and 20, and an air processing unit 22 for mixing fresh, heated and recirculated air prior to introduction into the room A, communicate with the heater unit 16. A fresh air inlet opening 24 extends through the outside wall 10 in flow communication with the air processing unit 22, which may be of the type disclosed in our co-pending application Serial No. 742,393, filed June 16, 1958. An outside air intake unit 30, constructed in accordance with the present invention for protective regulation of air flow through the opening 24, is designated generally at 30, and will now be described in detail.

The entire unit 30 is constructed of heavy gauge aluminum, thereby eliminating all risk of rusting and consequent unit deterioration and possible staining of the adjacent building wall surfaces. As best seen in Figures 2 and 3, a unitary house 32 provides a generally tubular duct of rectangular cross section. The aluminum metal forming the housing 32 is given an anodic surface protection treatment, and is further externally coated with a heavy asphaltum to isolate the metal surfaces from direct contact with the surrounding masonry when inserted within the opening 24 of the wall 10. The longitudinal depth of the housing 32 is sufficiently small so as to permit the entire unit 30 to be inserted flush with the outside surface of any building wall having a minimum overall thickness of about six inches. The housing depth is sufficiently large so as to provide a proper louver arrangement for air direction and filtering purposes, as will hereinafter be set forth.

The housing 32 provides a peripheral side wall 34 integrally terminating in a transversely outwardly extending picture-frame type of face flange 36 at its front end, and terminating in a transversely inwardly extending edge flange 38 at its rear end. The face flange 36 is formed by integrally continuous and reversely bent extensions of the side wall 34, and is adapted to define a peripherally continuous groove or kerf to receive the rectangular peripheral edge of a metal grille 40. The grille 40 is formed of expanded aluminum providing a flattened, open mesh of diamond-shape openings. The grille is anodized in any suitable color, such as gold, for both decorative appearance and protection against weathering and discoloration. The face flange 36 further serves to provide mounting means for receiving connector bolts 42 to secure the unit 30 within the masonry opening 24 of wall 10.

As best seen in Figure 3 of the drawing, double vertical rows of horizontally extending louvers are mounted within the housing 32. Each louver is of identical form and size, the outer series being indicated generally at 44 and the inner series generally at 46. Each louver is of elongated form having a main deflector surface 48 disposed at an angle of 30° to the vertical plane of the air inlet opening defined by the face flange 36. The forward longitudinal edge of the surface 48 terminates in an angularly downwardly bent visor flange 50, disposed at an included angle of 135° with respect to the surface 48. The surface depth of the visor flange 50 is substantially shorter than that of the main deflector surface 48, and provides only about ⅓ as much total air-engaging surface as the main deflector surface 48. Mounting ears 52 extend at right angles to the main deflector surface 48 at opposite ends of the vanes, and provide suitable apertures for the receipt of mounting bolts to fixedly secure the plurality of vanes in their particularly oriented relation.

It will be apparent that a plurality of free paths of air flow are provided through the housing 34, from the inlet opening defined by face flange 36, between the adjacent vanes of each of the outer and inner series 44 and 46, to the discharge opening defined by edge flange 38. During such flow, the louvers present angularly-oriented baffling and deflecting surfaces against which water or other entrained foreign matter will impinge, be obstructed, and drain downwardly. It will be apparent that even foreign particles having an entry or impingement path from above which closely approaches the horizontal will be effectively precluded from passing through the housing 32 by one or more of the louvers of the series 44 and 46. It is a particularly important feature of the present invention that the louvers be shaped and oriented in the manner described, and that two such rows, providing an outer series and an inner series, be mounted within the unit housing.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What we claim as new and desire to secure by Letters Patent of the United States is:

1. A weatherproof outside air intake louver unit for high velocity air flow, comprising a unitary housing adapted to be inserted within an opening in an outside wall of a building, said housing having a peripherally continuous side wall integrally terminating at its front end in a transversely outwardly extending face flange defining an inlet opening and terminating at its rear end in a peripheral edge defining a discharge opening, a plurality of identical longitudinally elongated louvers horizontally disposed within said housing in a first row adjacent said inlet opening and a second row adjacent said discharge opening, the louvers of each row being in vertical alignment one above the other in a plane parallel to said inlet opening, each louver of one row being in horizontal alignment with a corresponding louver of the other row, each louver having a main deflector surface flat throughout its full extent and inclined angularly downwardly toward the plane of said inlet opening, each louver providing a flat visor flange at the forward longitudinal edge of said main deflector surface inclined more steeply angularly downwardly toward the plane of said inlet opening than said main deflector surface, the visor flanges of said louvers lying in parallel planes, and each intermediate louver of said second row having its main deflector surface substantially co-planar with the main deflector surface of the corresponding next lower louver of said first row, whereby said louvers serve to present angularly oriented baffling surfaces against which foreign matter entrained by wind-directed air flowing into the inlet opening of said unit will be precluded from passing outwardly from the discharge opening thereof, while providing straight angularly upward paths of free air flow intermediate vertically adjacent louvers of said first row and the corresponding next upper louvers of said second row.

2. A weatherproof outside air intake louver unit, comprising a unitary housing having a peripheral side wall integrally terminating at its front end in a transversely outwardly extending peripheral face flange defining an inlet opening and terminating at its rear end in a peripheral edge defining a discharge opening, said face flange being reversely bent upon itself to define a peripheral groove opening transversely inwardly toward said inlet opening, an open mesh grille extending across said inlet opening and having its peripheral edge secured within said groove, and a plurality of identical longitudinally elongated louvers horizontally disposed within said housing in a first row adjacent said inlet opening and a second row adjacent said discharge opening, the louvers of each row being in vertical alignment one above the other in a plane parallel to said inlet opening, each louver of one row being in horizontal alignment with a corresponding louver of the other row, each louver having a main deflector surface flat throughout its full extent and inclined angularly downwardly toward the plane of said inlet opening, each louver providing a flat visor flange at the forward longitudinal edge of said main deflector surface inclined more steeply angularly downwardly toward the plane of said inlet opening than said main deflector surface, the visor flanges of said louvers lying in parallel planes, and each intermediate louver of said second row having its main deflector surface substantially co-planar with the main deflector surface of the corresponding next lower louver of said first row, whereby said louvers serve to present angularly-oriented baffling surfaces against which foreign matter entrained by wind-directed air flowing into the inlet opening of said unit will be precluded from passing outwardly from the discharge opening thereof, while providing straight angularly upward paths of free air flow intermediate vertically adjacent louvers of said first row and the corresponding next upper louvers of said second row.

References Cited in the file of this patent

UNITED STATES PATENTS

| | | |
|---|---|---|
| 1,995,456 | Kannel | Mar. 26, 1935 |
| 2,364,271 | Carver | Dec. 5, 1944 |
| 2,456,312 | Paget | Dec. 14, 1948 |

OTHER REFERENCES

Louver Light Corp. Catalogue entitled "Extruded Aluminum Louvers, Solar Canopies, Venthousings," 50 E. 42nd St., New York city, 8 pp. The catalogue is unidentified otherwise. Pages 2 and 5 only, required.